United States Patent
Chen

(10) Patent No.: US 11,258,474 B2
(45) Date of Patent: Feb. 22, 2022

(54) METHOD FOR REDUCING SAR VALUE OF MOBILE TERMINAL, STORAGE MEDIUM AND MOBILE TERMINAL

(71) Applicant: HuiZhou TCL Mobile Communication Co., Ltd., HuiZhou (CN)

(72) Inventor: Wei Chen, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 6 days.

(21) Appl. No.: 16/628,039

(22) PCT Filed: Jul. 10, 2018

(86) PCT No.: PCT/CN2018/095120
§ 371 (c)(1),
(2) Date: Jan. 2, 2020

(87) PCT Pub. No.: WO2019/011231
PCT Pub. Date: Jan. 17, 2019

(65) Prior Publication Data
US 2021/0143856 A1    May 13, 2021

(30) Foreign Application Priority Data
Jul. 10, 2017    (CN) .......................... 201710556957.8

(51) Int. Cl.
*H04B 1/3827*    (2015.01)
*H04B 7/06*    (2006.01)
(Continued)

(52) U.S. Cl.
CPC ......... *H04B 1/3838* (2013.01); *H04B 7/0602* (2013.01); *H04W 52/265* (2013.01); *H04W 52/267* (2013.01)

(58) Field of Classification Search
CPC .......... H01Q 3/24; H04B 1/44; H04B 7/0404; H04B 7/0608; H04B 7/0802;
(Continued)

(56) References Cited

U.S. PATENT DOCUMENTS

2012/0190398 A1* 7/2012 Leukkunen .......... H04B 7/0691
455/522
2013/0310109 A1* 11/2013 Filipovic ............... H04W 76/18
455/553.1
(Continued)

FOREIGN PATENT DOCUMENTS

CN    104779437    7/2015
CN    104980205    10/2015
(Continued)

OTHER PUBLICATIONS

International Search Report and the Written Opinion dated Sep. 5, 2018 From the International Searching Authority Re. Application No. PCT/CN2018/095120 and Its Translation of Search Report Into English. (9 Pages).
(Continued)

*Primary Examiner* — Lee Nguyen

(57) ABSTRACT

The invention discloses a method for reducing an SAR value of a mobile terminal, a storage medium and a mobile terminal. The method comprises: detecting and comparing signal strengths of an upper antenna and a lower antenna of the mobile terminal in real time during a call; and when it is detected that the signal strength of the upper antenna of the mobile terminal is greater than that of the lower antenna, switching the communication work of the mobile terminal to the upper antenna, and reducing the radio frequency transmitting power of the upper antenna. By adoption of the scheme, the SAR value of the mobile terminal can be reduced.

15 Claims, 2 Drawing Sheets

(51) Int. Cl.
*H04W 52/26* (2009.01)
*H04W 52/36* (2009.01)

(58) Field of Classification Search
CPC .... H04B 7/0814; H04B 88/06; H04B 1/3838; H04B 7/0602; H04W 24/02; H04W 36/14; H04W 36/30; H04W 72/085; H04W 76/027; H04W 88/06; H04W 52/265; H04W 52/267
USPC ............................................ 455/277.1–277.2
See application file for complete search history.

(56) References Cited

U.S. PATENT DOCUMENTS

| | | | |
|---|---|---|---|
| 2017/0126265 A1 | 5/2017 | Black et al. | |
| 2017/0358838 A1* | 12/2017 | Huang | H01Q 9/14 |
| 2020/0127693 A1* | 4/2020 | Li | H04W 52/288 |

FOREIGN PATENT DOCUMENTS

| | | |
|---|---|---|
| CN | 104993856 | 10/2015 |
| CN | 105978635 | 9/2016 |
| CN | 106301441 | 1/2017 |
| CN | 106533455 | 3/2017 |
| CN | 106572527 | 4/2017 |
| CN | 107277909 | 10/2017 |
| EP | 3043481 | 7/2016 |
| JP | 2006-311449 | 11/2006 |
| WO | WO 2019/011231 | 1/2019 |

OTHER PUBLICATIONS

Notification of Office Action and Search Report dated Jul. 20, 2020 From the State Intellectual Property Office of the People's Republic of China Re. Application No. 201710556957.8 and Its Translation of Office Action Into English. (16 Pages).

* cited by examiner

METHOD FOR REDUCING SAR VALUE OF MOBILE TERMINAL, STORAGE MEDIUM AND MOBILE TERMINAL

RELATED APPLICATIONS

This application is a National Phase of PCT Patent Application No. PCT/CN2018/095120 having International filing date of Jul. 10, 2018, which claims the benefit of priority of Chinese Patent Application No. 201710556957.8 filed on Jul. 10, 2017. The contents of the above applications are all incorporated by reference as if fully set forth herein in their entirety.

FIELD AND BACKGROUND OF THE INVENTION

The present invention relates to a mobile terminal, and more particularly to a method for reducing a specific absorption rate of a mobile terminal, a related storage medium and a related mobile terminal.

The antenna design of the current mobile terminals becomes more and more complicated. Taking a cell phone as an example, in order to meet the communication demand, the design may adopt a top antenna and a bottom antenna in a cell phone. In other words, when a user holds the bottom antenna of the cell phone, the communication performance of the bottom antenna is reduced. At this time, the communication function should be switched to the top antenna to satisfy the requirements of the antenna transmitting/receiving performances.

However, the above-mentioned switching mechanism introduces a problem. That is, when a user is making a phone call, the top portion is closer to the head of the user. Therefore, if the RF signal is transmitted by the top antenna, the specific absorption rate (SAR) of the user's head may be too high to cause an irreparable harm to the user.

Therefore, the current technology needs to be improved.

SUMMARY OF THE INVENTION

One objective of an embodiment of the present invention is to provide a method for reducing a specific absorption rate of a mobile terminal, a related storage medium and a related mobile terminal.

According to a first aspect of the present invention, a method for reducing a specific absorption rate (SAR) of a mobile terminal is disclosed. The method comprises: during a communication process, examining a signal magnitude of a top antenna of the mobile terminal and a signal magnitude of a bottom antenna of the mobile terminal and comparing the signal magnitude of the top antenna with the signal magnitude of the bottom antenna; and switching a communication workload to the top antenna and reducing a radio frequency (RF) transmitting power of the top antenna if the signal magnitude of the top antenna is larger than the signal magnitude of the bottom antenna.

Optionally, the step of examining the signal magnitude of the top antenna of the mobile terminal and the signal magnitude of the bottom antenna of the mobile terminal and comparing the signal magnitude of the top antenna with the signal magnitude of the bottom antenna during the communication process comprises: utilizing a baseband chip to real-time calculate the signal magnitude of the top antenna and the signal magnitude of the bottom antenna during the communication process; and comparing the signal magnitude of the top antenna with the signal magnitude of the bottom antenna.

Optionally, the step of examining the signal magnitude of the top antenna of the mobile terminal and the signal magnitude of the bottom antenna of the mobile terminal and comparing the signal magnitude of the top antenna with the signal magnitude of the bottom antenna during the communication process comprises: examining a signal quality of the top antenna and a signal quality of the bottom antenna and comparing the signal quality of the top antenna with the signal quality of the bottom antenna during the communication process.

Optionally, the step of switching the communication workload to the top antenna and reducing the radio frequency (RF) transmitting power of the top antenna if the signal magnitude of the top antenna is larger than the signal magnitude of the bottom antenna comprises: utilizing a double pole double throw switch to switch the communication workload to the top antenna if the signal magnitude of the top antenna is larger than the signal magnitude of the bottom antenna; and utilizing a RF chip to reduce the radio frequency (RF) transmitting power of the top antenna.

Optionally, the method further comprises: completing a process if the signal magnitude of the top antenna is lower than the signal magnitude of the bottom antenna after the step of examining the signal magnitude of the top antenna of the mobile terminal and the signal magnitude of the bottom antenna of the mobile terminal and comparing the signal magnitude of the top antenna with the signal magnitude of the bottom antenna during the communication process.

Optionally, the mobile terminal is a smart phone.

According to a second aspect of the present invention, a storage medium is disclosed. The storage medium stores a plurality of instructions executable by a processor to perform operations. The operations comprises:

during a communication process, examining a signal magnitude of a top antenna of the mobile terminal and a signal magnitude of a bottom antenna of the mobile terminal and comparing the signal magnitude of the top antenna with the signal magnitude of the bottom antenna; and switching a communication workload to the top antenna and reducing a radio frequency (RF) transmitting power of the top antenna if the signal magnitude of the top antenna is larger than the signal magnitude of the bottom antenna.

Optionally, the plurality of instructions are executable by the processor to perform operations:

utilizing a baseband chip to real-time calculate the signal magnitude of the top antenna and the signal magnitude of the bottom antenna during the communication process; and comparing the signal magnitude of the top antenna with the signal magnitude of the bottom antenna.

Optionally, the plurality of instructions are executable by the processor to perform operations:

utilizing a double pole double throw switch to switch the communication workload to the top antenna if the signal magnitude of the top antenna is larger than the signal magnitude of the bottom antenna;

utilizing a RF chip to reduce the radio frequency (RF) transmitting power of the top antenna; and completing a process if the signal magnitude of the top antenna is lower than the signal magnitude of the bottom antenna.

Optionally, the plurality of instructions are executable by the processor to perform operations:

examining a signal quality of the top antenna and a signal quality of the bottom antenna and comparing the signal quality of the top antenna with the signal quality of the bottom antenna.

According to a third aspect of the present invention, a mobile terminal is disclosed. The mobile terminal comprises: a storage device configured to store a plurality of instructions, and a processer configured to execute the plurality of instructions to perform operations of:

during a communication process, examining a signal magnitude of a top antenna of the mobile terminal and a signal magnitude of a bottom antenna of the mobile terminal and comparing the signal magnitude of the top antenna with the signal magnitude of the bottom antenna; and switching a communication workload to the top antenna and reducing a radio frequency (RF) transmitting power of the top antenna if the signal magnitude of the top antenna is larger than the signal magnitude of the bottom antenna.

Optionally, the operation of examining the signal magnitude of the top antenna of the mobile terminal and the signal magnitude of the bottom antenna of the mobile terminal and comparing the signal magnitude of the top antenna with the signal magnitude of the bottom antenna during the communication process comprises:

utilizing a baseband chip to real-time calculate the signal magnitude of the top antenna and the signal magnitude of the bottom antenna during the communication process; and comparing the signal magnitude of the top antenna with the signal magnitude of the bottom antenna.

Optionally, the operation of examining the signal magnitude of the top antenna of the mobile terminal and the signal magnitude of the bottom antenna of the mobile terminal and comparing the signal magnitude of the top antenna with the signal magnitude of the bottom antenna during the communication process comprises:

examining a signal quality of the top antenna and a signal quality of the bottom antenna and comparing the signal quality of the top antenna with the signal quality of the bottom antenna during the communication process.

Optionally, the operation of switching the communication workload to the top antenna and reducing the radio frequency (RF) transmitting power of the top antenna if the signal magnitude of the top antenna is larger than the signal magnitude of the bottom antenna comprises:

utilizing a double pole double throw switch to switch the communication workload to the top antenna if the signal magnitude of the top antenna is larger than the signal magnitude of the bottom antenna; and utilizing a RF chip to reduce the radio frequency (RF) transmitting power of the top antenna.

Optionally, completing a process if the signal magnitude of the top antenna is lower than the signal magnitude of the bottom antenna after the operation of examining the signal magnitude of the top antenna of the mobile terminal and the signal magnitude of the bottom antenna of the mobile terminal and comparing the signal magnitude of the top antenna with the signal magnitude of the bottom antenna during the communication process.

In contrast to the conventional art, an embodiment of the present invention real-time exams and compares the signal magnitudes of the top antenna and bottom antenna of the mobile terminal. If the signal magnitude of the top antenna is larger than the signal magnitude of the bottom antenna, then a communication workload is switched to the top antenna and the radio frequency (RF) transmitting power of the top antenna is reduced. In this way, the communication workload is always done by an antenna having a stronger transmitting signal. Furthermore, when the communication workload is switched to the top antenna, the transmitting power of the top antenna could be reduced to reduce the SAR of the mobile terminal.

DESCRIPTION OF SPECIFIC EMBODIMENTS OF THE INVENTION

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Figure 1:
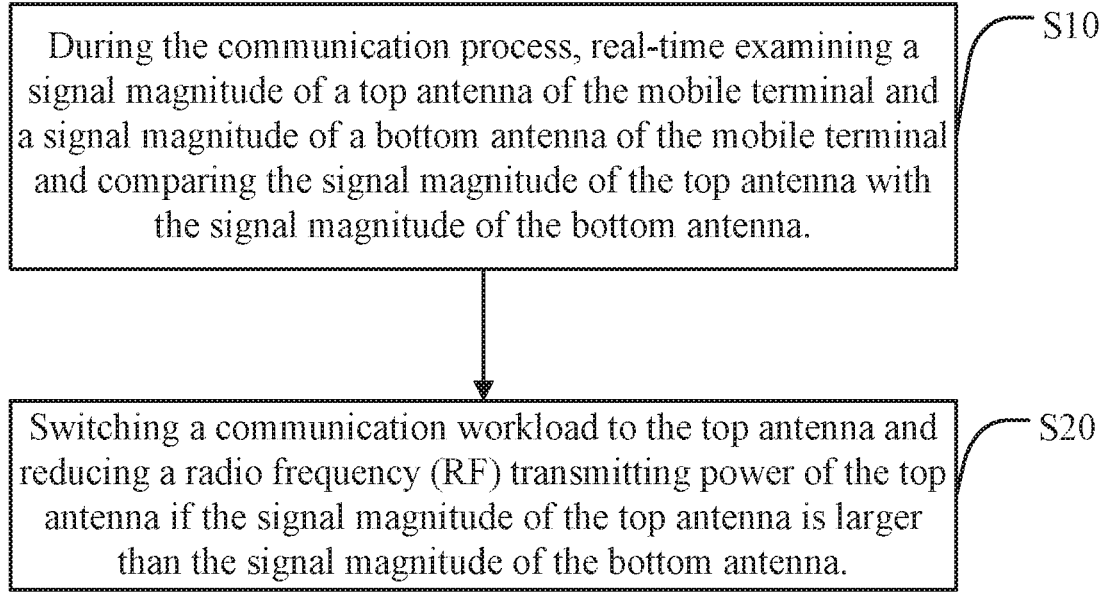
FIG. 1 is a flow chart of a method for reducing SAR of a mobile terminal according to an embodiment of the present invention.

Please refer to FIG. 1. FIG. 1 is a flow chart of a method for reducing SAR of a mobile terminal according to an embodiment of the present invention. As shown in FIG. 1, the flow chart comprises the following steps:

S10: During the communication process, examining a signal magnitude of a top antenna of the mobile terminal and a signal magnitude of a bottom antenna of the mobile terminal and comparing the signal magnitude of the top antenna with the signal magnitude of the bottom antenna.

S20: Switching a communication workload to the top antenna and reducing a radio frequency (RF) transmitting power of the top antenna if the signal magnitude of the top antenna is larger than the signal magnitude of the bottom antenna.

Specifically, the current cell phone often has a top antenna and a bottom antenna and the communication workload is often predetermined to be handled by the bottom antenna. That is, the bottom antenna is used to receive/transmit the RF signals. However, when the signal quality of the bottom antenna is low enough to a specific degree, the communication workload is switched to the top antenna. However, the RF signal transmitted/received by the top antenna is in middle/high frequency band, its corresponding SAR is higher than the SAR of the low frequency band.

When the cell phone is in the communication process, the top antenna is close to the head of the user. At this time, if the top antenna transmits the RF signal, the SAR of the user's head may too high to cause damages to the user.

In order to solve the above-mentioned issue, this embodiment real-time exams and compares the signal magnitudes of the top antenna and the bottom antenna and switch the communication workload to the top antenna and reduce the RF transmitting power of the top antenna if the signal magnitude of the top antenna is larger than that of the bottom antenna. That is, the communication workload is handled by an antenna having a stronger transmitting signal. Further, when the top antenna handles the communication workload, the transmitting power of the top antenna is reduced to reduce the SAR and prevent from damaging the user's body.

Specifically, in step S10, when the cell phone is in the communication process, the baseband chip real-time calculates the signal magnitudes of the top antenna and the bottom antenna and real-time compares the signal magnitude of the top antenna with the signal magnitude of the bottom antenna. In addition, the signal quality of the top antenna and the signal quality of the bottom antenna are also compared. Here, the signal quality may include signal-to-noise ratio, audio stability, audio transmission rate, or audio distortion.

The signal quality is often determined by the signal magnitude of the antenna. The stronger the signal magnitude is, the better the signal quality is. Therefore, through comparing the signal magnitudes of the top antenna and the bottom antenna, it is fast and easy to determine which antenna should handle the communication workload.

Optimally, in order to ensure that the cell phone could have the best communication quality, this embodiment could further exam the signal qualities of the top antenna and the bottom antenna. That is, when the top antenna is dealing with the communication workload, the signal-to-noise ratio, the audio stability, the audio transmission rate, and/or audio distortion could be examined to obtain a top antenna communication quality evaluation value. Similarly, when the bottom antenna is dealing with the communication workload, the signal-to-noise ratio, the audio stability, the audio transmission rate, and/or audio distortion could be examined to obtain a bottom antenna communication quality evaluation value. This embodiment could determine which antenna handles the communication workload further through comparing the two evaluation values, Specifically, in the step S20, when the signal magnitude of the top antenna is larger than the signal magnitude of the bottom antenna or the signal quality of the top antenna is larger than the signal quality of the bottom antenna, the communication workload is switched to the top antenna through a double pole double throw switch. Then, the RF transmitting power of the top antenna is reduced through the RF chip. Specifically, the baseband could output a signal and controls the switching operation of the double pole double throw switch through the voltage level of the signal. When the voltage level of the output signal of the baseband chip changes, it represents that the double pole double throw switch is switched. At this time, the baseband chip outputs a command to control the transceiver and the RF chip to reduce the RF transmitting power of the top antenna.

In addition, the step S20 further comprises: when the signal magnitude of the top antenna is lower than the signal magnitude of the bottom antenna or the signal quality of the top antenna is lower than the signal quality of the bottom antenna, then the determination process is completed. That is, at this moment, the cell phone is still in the predetermined condition to use the bottom antenna operating in a maximum power to handle the communication workload by transmitting the RF signals.

The present invention further provides a storage medium storing a plurality of instructions. The instructions are used to be executed by a processor to perform the above method.

A person having ordinary skills in the art could understand that some or all of the steps of the above method could be completed through sending instructions to instruct corresponding hardware. The instructions could be stored in a computer readable storage medium, which could be a ROM, a RAM, a hard disk or an optical disk.

Figure 2:
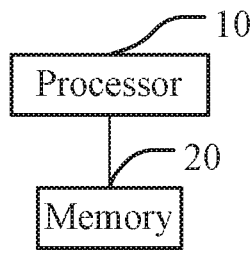
FIG. 2 is a block diagram of a mobile terminal according to an embodiment of the present invention.

Please refer to FIG. 2. FIG. 2 is a block diagram of a mobile terminal according to an embodiment of the present invention. The mobile terminal comprises a processor 10 and a storage device 20. The storage device 20 is used to store a plurality of instructions. The processor 10 is used to execute instructions. Therefore, the instructions are loaded and executed by the processor 10 to perform the above method for reducing SAR of the mobile terminal.

In an embodiment, the processor 10 could be a central processing unit, a microprocessor, or other data processing chip for executing the program codes or data storage in the storage device 20.

In an embodiment, the storage device 20 could be an inner storage unit of a device, such as a hard disk or a RAM of the device. In another embodiment, the storage device 20 could be an external storage unit of a device, such as an inserted hard disk, a smart media card (SMC), a secure digital (SD) card, or a flash card.

In addition, the storage device 20 could comprise both an internal storage unit and an external storage unit. The storage device 20 is used to store the application software and data installed in the device. The storage device 20 could be further used to temporarily store data, which are already outputted or to be outputted.

Figure 3:
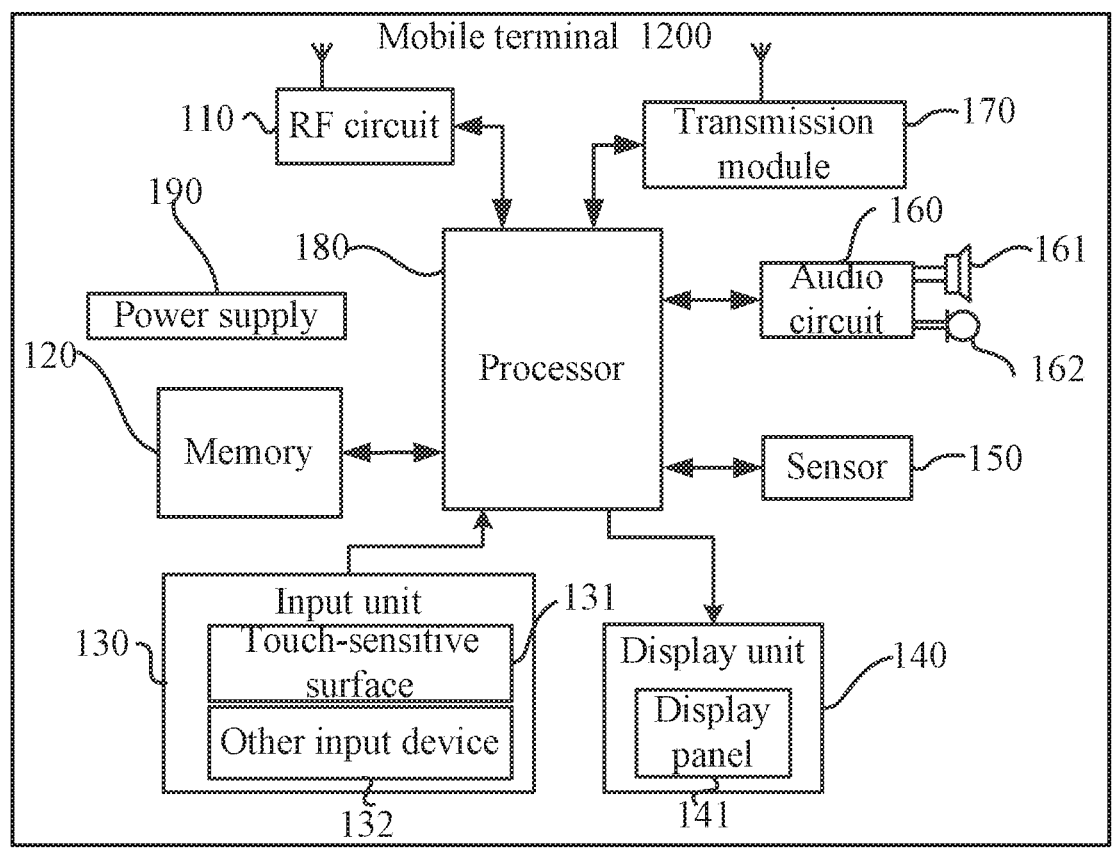
FIG. 3 is a block diagram of a mobile terminal according to another embodiment of the present invention.

Please refer to FIG. 3. FIG. 3 is a block diagram of a mobile terminal according to another embodiment of the present invention. The mobile terminal 1200 could be a smart phone or a tablet.

As shown in FIG. 3, the mobile terminal 1200 may comprise components, such as a radio frequency (RF) circuit 110, a memory 120 including one or more (only one is shown in the figure) computer-readable storage media, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 1200 is not limited to the structure of the mobile terminal 1200 shown in FIG. 3. The mobile terminal 1200 may comprise more or less components than those illustrated in the figure, or some components may be combined, or may have different components arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 3, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

The mobile terminal 1200 could further comprise a camera (such as front camera or back camera) or a Bluetooth module. In this embodiment, the display unit 140 is a touch panel. The mobile terminal further comprises a storage device and one or more programs (instructions) stored in the storage device. These programs (instructions) are executed by one or more processors to perform operations of:

during a communication process, examining a signal magnitude of a top antenna of the mobile terminal and a signal magnitude of a bottom antenna of the mobile terminal and comparing the signal magnitude of the top antenna with the signal magnitude of the bottom antenna; and switching a communication workload to the top antenna and reducing a radio frequency (RF) transmitting power of the top antenna if the signal magnitude of the top antenna is larger than the signal magnitude of the bottom antenna.

Furthermore, the operation of examining the signal magnitude of the top antenna of the mobile terminal and the signal magnitude of the bottom antenna of the mobile terminal and comparing the signal magnitude of the top antenna with the signal magnitude of the bottom antenna during the communication process comprises:

utilizing a baseband chip to real-time calculate the signal magnitude of the top antenna and the signal magnitude of the bottom antenna during the communication process; and comparing the signal magnitude of the top antenna with the signal magnitude of the bottom antenna.

Furthermore, the operation of examining the signal magnitude of the top antenna of the mobile terminal and the signal magnitude of the bottom antenna of the mobile terminal and comparing the signal magnitude of the top antenna with the signal magnitude of the bottom antenna during the communication process comprises:

examining a signal quality of the top antenna and a signal quality of the bottom antenna and comparing the signal quality of the top antenna with the signal quality of the bottom antenna during the communication process.

Furthermore, the operation of switching the communication workload to the top antenna and reducing the radio frequency (RF) transmitting power of the top antenna if the signal magnitude of the top antenna is larger than the signal magnitude of the bottom antenna comprises:

utilizing a double pole double throw switch to switch the communication workload to the top antenna if the signal magnitude of the top antenna is larger than the signal magnitude of the bottom antenna; and utilizing a RF chip to reduce the radio frequency (RF) transmitting power of the top antenna.

Furthermore, completing a process if the signal magnitude of the top antenna is lower than the signal magnitude of the bottom antenna after the operation of examining the signal magnitude of the top antenna of the mobile terminal and the signal magnitude of the bottom antenna of the mobile terminal and comparing the signal magnitude of the top antenna with the signal magnitude of the bottom antenna during the communication process.

From the above, an embodiment of the present invention real-time exams and compares the signal magnitudes of the top antenna and bottom antenna of the mobile terminal. If the signal magnitude of the top antenna is larger than the signal magnitude of the bottom antenna, then a communication workload is switched to the top antenna and the radio frequency (RF) transmitting power of the top antenna is reduced. In this way, the communication workload is always done by an antenna having a stronger transmitting signal. Furthermore, when the communication workload is switched to the top antenna, the transmitting power of the top antenna could be reduced to reduce the SAR of the mobile terminal.

Above are embodiments of the present invention, which does not limit the scope of the present invention. Any modifications, equivalent replacements or improvements within the spirit and principles of the embodiment described above should be covered by the protected scope of the invention.

What is claimed is:

1. A method for reducing a specific absorption rate (SAR) of a mobile terminal, the method comprising:

during a communication process, examining a signal magnitude of a top antenna of the mobile terminal and a signal magnitude of a bottom antenna of the mobile terminal and comparing the signal magnitude of the top antenna with the signal magnitude of the bottom antenna;

utilizing a double pole double throw switch to switch a communication workload to the top antenna if the signal magnitude of the top antenna is larger than the signal magnitude of the bottom antenna; and utilizing a RF chip to reduce the radio frequency (RF) transmitting power of the top antenna.

2. The method of claim 1, wherein the step of examining the signal magnitude of the top antenna of the mobile terminal and the signal magnitude of the bottom antenna of the mobile terminal and comparing the signal magnitude of the top antenna with the signal magnitude of the bottom antenna during the communication process comprises:

utilizing a baseband chip to real-time calculate the signal magnitude of the top antenna and the signal magnitude of the bottom antenna during the communication process; and comparing the signal magnitude of the top antenna with the signal magnitude of the bottom antenna.

3. The method of claim 1, wherein the step of examining the signal magnitude of the top antenna of the mobile terminal and the signal magnitude of the bottom antenna of the mobile terminal and comparing the signal magnitude of the top antenna with the signal magnitude of the bottom antenna during the communication process comprises:

examining a signal quality of the top antenna and a signal quality of the bottom antenna and comparing the signal quality of the top antenna with the signal quality of the bottom antenna during the communication process.

4. The method of claim 1, further comprising:

completing a process if the signal magnitude of the top antenna is lower than the signal magnitude of the bottom antenna after the step of examining the signal magnitude of the top antenna of the mobile terminal and the signal magnitude of the bottom antenna of the mobile terminal and comparing the signal magnitude of the top antenna with the signal magnitude of the bottom antenna during the communication process.

5. The method of claim 4, further comprising: using the bottom antenna operating in a maximum power to transmit RF signal if the signal magnitude of the top antenna is lower than the signal magnitude of the bottom antenna after the operation of examining the signal magnitude of the top antenna of the mobile terminal and the signal magnitude of the bottom antenna of the mobile terminal.

6. The method of claim 1, wherein the mobile terminal is a smart phone.

7. A storage medium, storing a plurality of instructions executable by a processor to perform operations, the operations comprising:
  during a communication process, examining a signal magnitude of a top antenna of the mobile terminal and a signal magnitude of a bottom antenna of the mobile terminal and comparing the signal magnitude of the top antenna with the signal magnitude of the bottom antenna;
  utilizing a double pole double throw switch to switch a communication workload to the top antenna if the signal magnitude of the top antenna is larger than the signal magnitude of the bottom antenna;
  utilizing a RF chip to reduce the radio frequency (RF) transmitting power of the top antenna and
  completing a process if the signal magnitude of the top antenna is lower than the signal magnitude of the bottom antenna.

8. The storage medium of claim 7, wherein the plurality of instructions are executable by the processor to perform operations:
  utilizing a baseband chip to real-time calculate the signal magnitude of the top antenna and the signal magnitude of the bottom antenna during the communication process; and
  comparing the signal magnitude of the top antenna with the signal magnitude of the bottom antenna.

9. The storage medium of claim 7, wherein the plurality of instructions are executable by the processor to perform operations:
  examining a signal quality of the top antenna and a signal quality of the bottom antenna and comparing the signal quality of the top antenna with the signal quality of the bottom antenna.

10. The storage medium of claim 7, wherein the plurality of instructions are executable by the processor to perform operation:
  using the bottom antenna operating in a maximum power to transmit RF signal if the signal magnitude of the top antenna is lower than the signal magnitude of the bottom antenna.

11. A mobile terminal comprising:
  a storage device, configured to store a plurality of instructions; and
  a processer, configured to execute the plurality of instructions to perform operations of:
  during a communication process, examining a signal magnitude of a top antenna of the mobile terminal and a signal magnitude of a bottom antenna of the mobile terminal and comparing the signal magnitude of the top antenna with the signal magnitude of the bottom antenna; and
  utilizing a double pole double throw switch to switch a communication workload to the top antenna if the signal magnitude of the top antenna is larger than the signal magnitude of the bottom antenna; and
  utilizing a RF chip to reduce the radio frequency (RF) transmitting power of the top antenna.

12. The mobile terminal of claim 11, wherein the operation of examining the signal magnitude of the top antenna of the mobile terminal and the signal magnitude of the bottom antenna of the mobile terminal and comparing the signal magnitude of the top antenna with the signal magnitude of the bottom antenna during the communication process comprises:
  utilizing a baseband chip to real-time calculate the signal magnitude of the top antenna and the signal magnitude of the bottom antenna during the communication process; and
  comparing the signal magnitude of the top antenna with the signal magnitude of the bottom antenna.

13. The mobile terminal of claim 11, wherein the operation of examining the signal magnitude of the top antenna of the mobile terminal and the signal magnitude of the bottom antenna of the mobile terminal and comparing the signal magnitude of the top antenna with the signal magnitude of the bottom antenna during the communication process comprises:
  examining a signal quality of the top antenna and a signal quality of the bottom antenna and comparing the signal quality of the top antenna with the signal quality of the bottom antenna during the communication process.

14. The mobile terminal of claim 11, wherein:
  completing a process if the signal magnitude of the top antenna is lower than the signal magnitude of the bottom antenna after the operation of examining the signal magnitude of the top antenna of the mobile terminal and the signal magnitude of the bottom antenna of the mobile terminal and comparing the signal magnitude of the top antenna with the signal magnitude of the bottom antenna during the communication process.

15. The mobile terminal of claim 14, wherein the completing a process if the signal magnitude of the top antenna is lower than the signal magnitude of the bottom antenna comprises:
  using the bottom antenna operating in a maximum power to transmit RF signal if the signal magnitude of the top antenna is lower than the signal magnitude of the bottom antenna after the operation of examining the signal magnitude of the top antenna of the mobile terminal and the signal magnitude of the bottom antenna of the mobile terminal.

\* \* \* \* \*